(12) United States Patent
Bradley

(10) Patent No.: US 8,297,424 B2
(45) Date of Patent: Oct. 30, 2012

(54) SINGLE ACTUATOR SELF-ADJUSTING DRY DUAL CLUTCH

(75) Inventor: Jesse B. Bradley, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 475 days.

(21) Appl. No.: 12/701,452

(22) Filed: Feb. 5, 2010

(65) Prior Publication Data

US 2011/0192693 A1  Aug. 11, 2011

(51) Int. Cl.
*F16D 25/10* (2006.01)
*F16D 13/75* (2006.01)
*F16H 3/093* (2006.01)

(52) U.S. Cl. .... 192/48.612; 74/330; 74/331; 192/48.91; 192/70.252; 192/111.16

(58) Field of Classification Search ............. 192/48.604, 192/48.609, 48.91, 70.252, 111.16
See application file for complete search history.

(56) References Cited

U.S. PATENT DOCUMENTS

| | | | | |
|---|---|---|---|---|
| 2,586,220 | A * | 2/1952 | Gerst | 192/48.612 |
| 7,080,722 | B2 * | 7/2006 | Vogt et al. | 192/48.8 |
| 2003/0164274 | A1 * | 9/2003 | Feldhaus et al. | 192/48.8 |

* cited by examiner

*Primary Examiner* — Rodney Bonck

(57) ABSTRACT

A self-adjusting twin or dual dry clutch assembly for a dual clutch transmission includes a single actuator. The clutch assembly includes one center and two outer clutch drive plates or discs which independently engage a pair of interleaved driven clutch plates or discs which are coupled to and drive a respective pair of transmission countershafts or layshafts. The single actuator translates an internal clutch carrier which acts upon the outer clutch plates through respective pluralities of linear one way clutches. Self-adjustment of the dual clutch assembly is achieved by additional linear one way clutches acting through pairs of spring biased control rods.

19 Claims, 5 Drawing Sheets

SINGLE ACTUATOR SELF-ADJUSTING DRY DUAL CLUTCH

FIELD

The present disclosure relates to a dry dual clutch for use with a dual clutch transmission and more particularly to a self-adjusting dry dual clutch having a single actuator which is especially suited for use with a dual clutch transmission.

BACKGROUND

The statements in this section merely provide background information related to the present disclosure and may or may not constitute prior art.

Dual clutch transmissions (DCT's) are becoming increasingly popular in passenger cars because of their performance and efficiency. Because a gear to be selected for an upshift or downshift can be pre-selected or "pre-staged" before a currently engaged gear is disengaged, the actual upshift or downshift essentially involves simply the disengagement of the engaged clutch and engagement of the disengaged clutch—an operation that can be accomplished in a small fraction of a second. Such rapid shifts lend a highly desirable and sporty performance to the powertrain and the vehicle. Since the dual clutch transmission is essentially a manual transmission incorporating a plurality of pairs of meshed gears and two driveline clutches, fuel economy is also very good. Not only does the dual clutch transmission have fewer components but it also eliminates the torque converter. The dual clutch transmission is thus also less expensive to manufacture than a comparable automatic transmission Because of its increasing popularity, significant research and development have recently been directed to improving the construction and operation of dual clutch transmissions. A target of such work has been the dual clutch arrangement that selectively and mutually exclusively provides drive torque to the two drive assemblies, usually layshaft or countershafts, in the transmission. Current transmission configurations utilize a pair of essentially identical clutches disposed on the axes of the countershafts or a pair of clutches in tandem which drive concentric shafts.

The current design state of clutch assemblies for dual clutch transmissions suggests that improvements in such clutches are both possible and desirable.

SUMMARY

The present invention provides a self-adjusting twin or dual dry clutch assembly for a dual clutch transmission having a single actuator. The clutch includes one center or intermediate and two outer drive plates or discs which independently engage an interleaved pair of driven clutch plates or discs which are coupled to and drive a respective pair of transmission countershafts or layshafts. The single actuator translates an inner clutch carrier which acts upon the outer clutch plates through pluralities of linear one-way clutches.

Each of the outer clutch plates is coupled to respective control rods through additional linear one-way clutches. Strong compression springs disposed about the control rods bias the respective linear one-way clutches and the associated outer clutch plates away from the center clutch plate. Weak compression springs bias the control rods, strong springs and outer clutch plates away from the center clutch plate. Translation of the actuator and inner carrier selectively engage one of the two clutches. Cooperation between the inner carrier, the linear one-way clutches, the control rods and the springs provide self adjustment to the dual clutch assembly as the clutch facing material wears.

Thus it is an aspect of the present invention to provide a clutch assembly for a dual clutch transmission.

It is a further aspect of the present invention to provide a dual clutch assembly for a dual clutch transmission.

It is a still further aspect of the present invention to provide a dry clutch assembly for a dual clutch transmission.

It is a further aspect of the present invention to provide a self-adjusting dual clutch assembly for a dual clutch transmission.

It is a still further aspect of the present invention to provide a self-adjusting dry clutch assembly for a dual clutch transmission.

It is a still further aspect of the present invention to provide a self-adjusting dual dry clutch assembly for a dual clutch transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
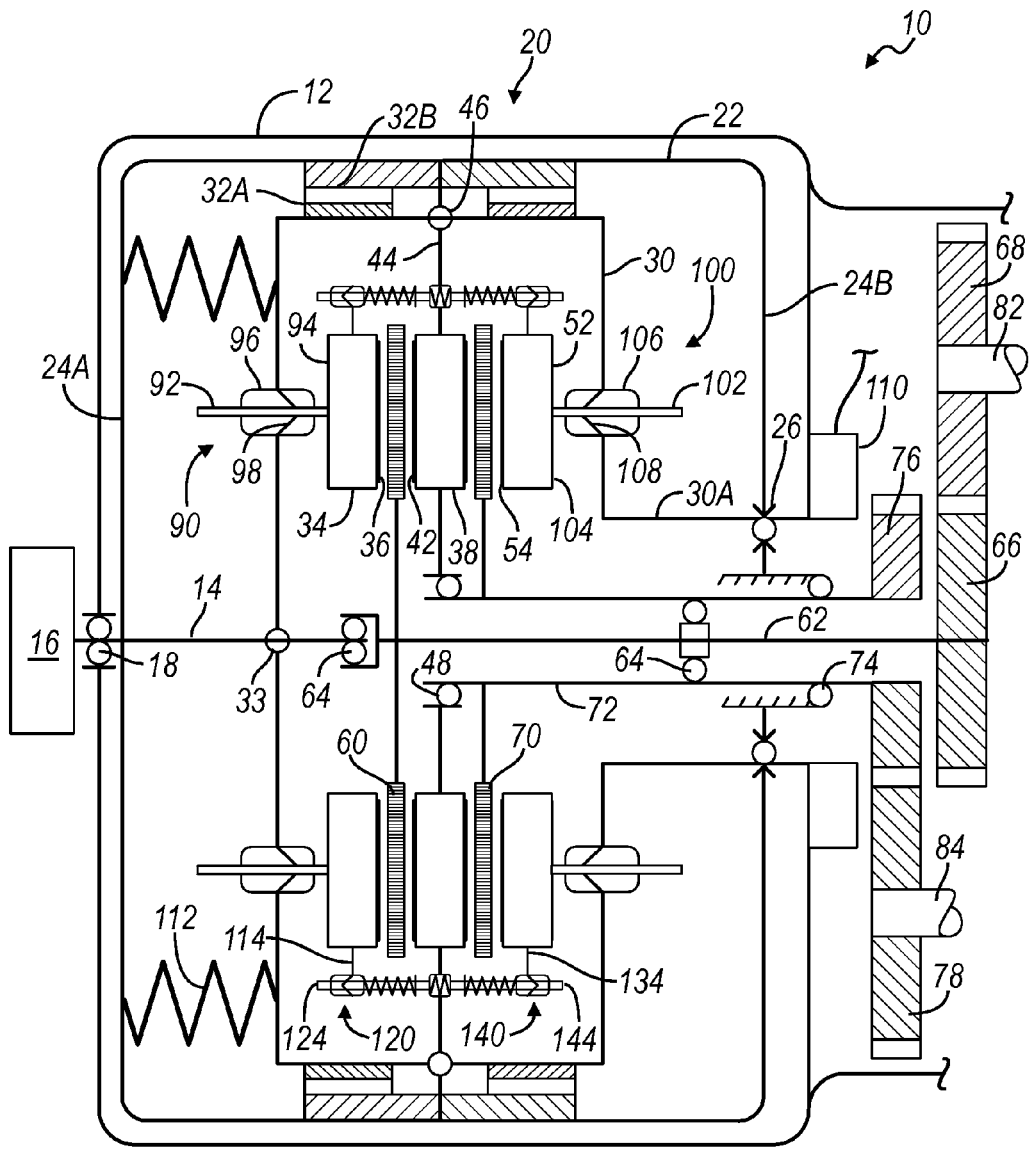
FIG. 1 is a diagrammatic view of a portion of a dual clutch transmission incorporating a clutch assembly according to the present invention.

With reference now to FIG. 1, a portion of a dual clutch transmission is illustrated and generally designated by the reference number 10. The dual clutch transmission 10 includes a clutch housing 12 having various shoulders, flanges and features which receive, locate and retain components of the dual clutch transmission 10. An input shaft 14 is coupled to and driven by a prime mover 16 such as a gasoline, Diesel, flex fuel or hybrid or electric power plant. The input shaft 14 is supported on bearings such as ball bearing assemblies 18.

A twin or dual dry clutch assembly 20 is disposed within the clutch housing 12 and includes an outer rotating housing or carrier 22 that is coupled to and driven by the input shaft 14. The outer housing or carrier 22 defines a cylinder having a closed end or radial wall 24A which is coupled to and driven by the input shaft 14 and an opposite end or partial wall 24B having an annular seal 26. Concentrically disposed within the outer housing or carrier 22 is a smaller, inner clutch carrier 30. The inner clutch carrier 30 is rotationally coupled to the outer housing or carrier 22 by an annular interengaging set of male and female splines 32A and 32B. A fluid seal 33 is disposed at the juncture of the input shaft 14 and the inner clutch carrier 30. The inner clutch carrier 30 may thus translate axially within the outer housing 22 but will remain coupled to and driven by the outer housing 22.

Disposed concentrically with the inner clutch carrier 30 of the dual clutch assembly 20 is a first annular friction clutch drive disc or plate 34 which is connected to and driven by the inner clutch carrier 30. The first clutch drive plate 34 includes clutch facing material 36 on its inner surface. Spaced from the first clutch drive plate 34 is a second, intermediate annular friction clutch drive disc or plate 38 which includes clutch facing material 42 on both surfaces. The second, intermediate clutch drive plate 38 is coupled to and driven by both the inner clutch carrier 30 and the outer clutch housing 22 by a radially extending drive disc 44. The radial drive disc 44 also fixes the axial position of the second, intermediate clutch drive plate 38 relative to the outer housing or carrier 22. At the intersection of the inner clutch carrier 30 and the drive disc 44, one of the components is discontinuous and a plurality of fluid tight seals 46 are incorporated. The second, intermediate clutch drive plate 38 is also piloted on an inner ball bearing assembly 48. Spaced from the second, intermediate clutch drive plate 38 is a third annular friction clutch drive disc or plate 52 which is also connected to and driven by the inner clutch carrier 30. The third clutch drive plate 52 includes clutch facing material 54 on its inner surface.

Between both the first and the second clutch plates 34 and 38 and the second and the third clutch plates 38 and 52 are driven annular clutch discs or plates. A first driven clutch plate 60, disposed between the first clutch plate 34 and the second clutch plate 38, may include clutch facing material and is coupled to and drives a first output shaft or member 62. The first output shaft or member 62 is supported on suitable bearing assemblies 64 and is coupled to and drives a first output gear 66 which, for example, may be associated with the even numbered gears of the transmission 10. A second driven clutch plate 70, disposed between the second clutch plate 38 and the third clutch plate 52, may include clutch facing material and is coupled to and drives a second drive tube, quill or output member 72. The second drive tube, quill or output member 72 is supported for rotation by suitable ball bearing assemblies 74 and is coupled to and drives a second output gear 76 which, for example, may be associated with the odd numbered gears of the transmission 10.

The first output gear 66 is in constant mesh with a first countershaft or layshaft input gear 68 which is secured to and drives a first countershaft or layshaft 82 which may be associated with, as noted, the even numbered gears, reverse, second and fourth, for example. The second output gear 76 is in constant mesh with a second countershaft or layshaft input gear 78 which is secured to and drives a second countershaft or layshaft 84 which may be associated with, as noted, the odd numbered gears, first, third and fifth, for example. Alternatively, the first output shaft or member 62 and the concentric second drive tube, quill or output member 72 may be coupled to and directly drive a countershaft 62 and a concentric quill or tubular countershaft 72 within the transmission 10 which are essentially extensions of these components of the clutch 10 beyond the clutch housing 20.

Figure 2:
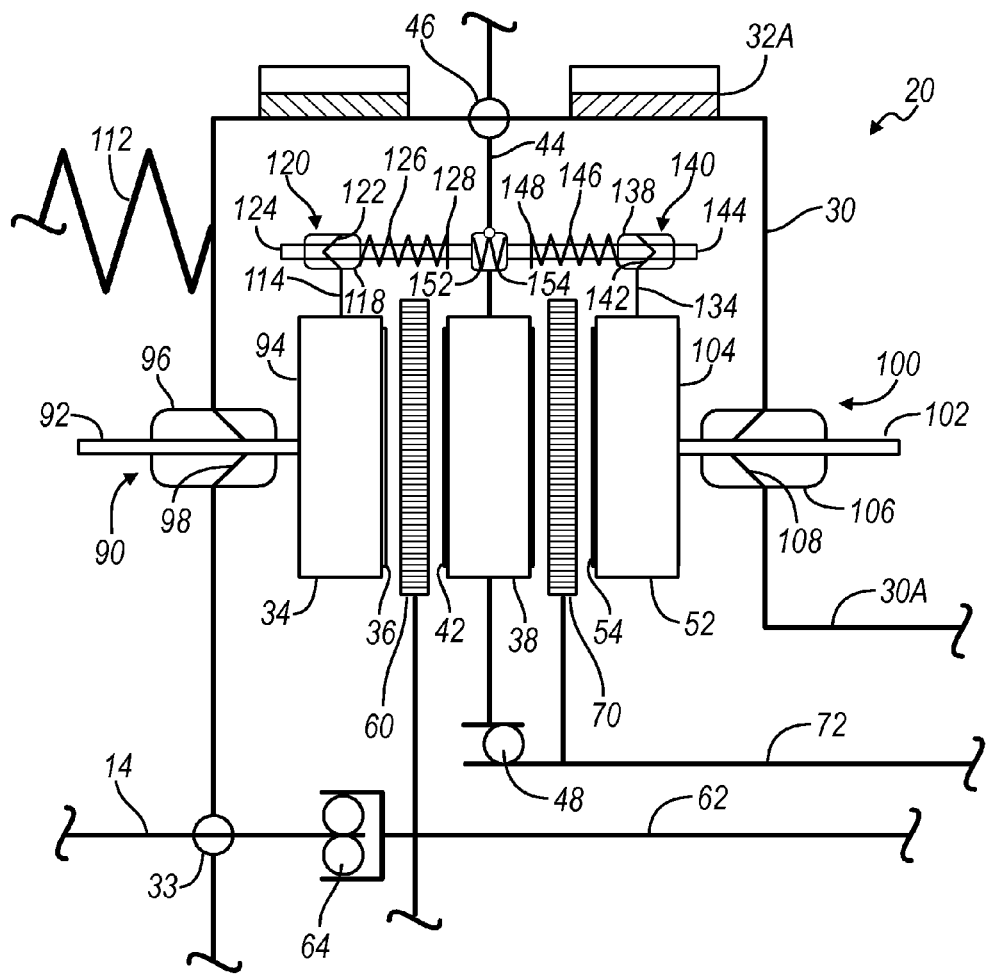
FIG. 2 is an enlarged diagrammatic view of a portion of a dual clutch assembly according to the present invention in neutral.

Referring now to FIGS. 1 and 2, operably disposed between the inner clutch carrier 30 and the first and third annular friction clutch drive disc or plates 34 and 52 are pluralities of linear one way clutches. A first plurality of linear one way or overrunning clutches 90 are mounted on the left side of the inner clutch carrier 30 behind the first annular clutch plate 34. Preferably, there are three linear one way clutches 90 disposed at equal 120° intervals around the inner clutch carrier 30 which engage a like number of first drive members, rods or shafts 92 which extend axially from the rear surface 94 of the first friction clutch plate 34. It will be appreciated that additional one way clutches 90 and shafts 92 disposed in suitable equal circumferential intervals may be utilized but that use of fewer than three of the assemblies is not recommended. The first plurality of one way clutches 90 each include a first housing 96 and a plurality of, for example, pawls, sprags or balls 98 which couple and translate the first rods or shafts 92 and the first friction clutch plate 34 to the right in FIGS. 1 and 2 when the housings 96 are translated to the right by translation of the inner clutch carrier 30 but release the coupling between the housings 96 and the rods or shafts 92 when the housings 96 and the inner clutch carrier 30 are translated to the left.

In a similar, symmetrical arrangement, a second plurality of linear one way or overrunning clutches 100 are mounted on the right side of the inner clutch member 30 behind the third annular clutch plate 52. Again, there are preferably three linear one way clutches 100 disposed in 120° intervals around the inner carrier 30 which engage a like number of second drive members, rods or shafts 102 which extend axially from the rear surface 104 of the third annular clutch plate 52 The second plurality of one way clutches 100 each include a second housing 106 and a plurality of pawls, sprags or balls 108 which couple and translate the second rods or shafts 102 and the third annular clutch plate 52 to the left in FIGS. 1 and 2 when the housings 106 are translated to the left by translation of the inner clutch carrier 30 but release the coupling between the second housings 106 and the rods or shafts 102 when the housings 106 and the inner clutch carrier 30 are translated to the right.

The inner clutch carrier 30 includes a tubular or cylindrical extension or member 30A at its end opposite the input shaft 14 which is coupled to an output of a single acting or bi-directional electric, hydraulic or pneumatic actuator or operator 110. The actuator or operator 110 is secured to the housing 12. An annular compression spring 112 which may take the form of a stack of spring washers such as wave washers or Belleville springs or a plurality of circumferentially spaced apart coil compression springs or spring washers provides a biasing or restoring force to the inner clutch carrier 30 relative to the outer housing 22 which opposes the force and travel of the actuator or operator 110. Activation of the operator 110 thus translates the inner clutch carrier 30, locks one of the one way clutches 90 or 100 and translates one of the annular clutch plates 34 or 52 while releasing the other one way clutch 90 or 100 and the associated annular clutch plate 34 or 52.

It will be appreciated that alternate configurations of the single acting or bi-directional operator 110 and spring 112 include a bi-directional actuator or operator which may eliminate the need for the spring 112 or an arrangement in which, for example, the spring 112 is utilized and the annular volume adjacent the right end 24A of the outer carrier or housing 22 is pressurized with hydraulic fluid to achieve translation of the inner clutch carrier 30. Furthermore, it may be desirable to incorporate a linear position sensor which senses the instantaneous position of the inner clutch carrier 30 and provides a signal or data regarding same to an associated transmission control module (TCM) (not illustrated).

The first annular clutch plate 34 also includes a radially extending first annulus 114 which is secured to a plurality of housings 118 of a plurality of third linear one way or overrunning clutches 120. The plurality of third linear one-way clutches 120 include pawls, sprags or balls 122 which engage and release a plurality of axially disposed first control rods 124. The plurality of third one way clutches 120 are configured to lock when the first annulus 114 (and the first annular clutch plate 34) translates to the left in FIGS. 1 and 2 relative to the first control rods 124 and release when the first annulus 114 translates to the right relative to the first control rods 124. A plurality of first compression springs 126 are received about the first control rods 124 between the housings 118 of the third one way clutches 120 and a plurality of stops 128 such as taper pins or C-washers and bias the first control rods 124 to the right relative to the third one way clutches 120.

A similar, symmetrical configuration is associated with the third annular clutch plate 52 which includes a radially extending second annulus 134 which is secured to a plurality of housings 138 of a plurality of fourth linear one-way or overrunning clutches 140. The plurality of fourth one way clutches 140 include pawls, sprags or balls 142 which engage and release a like plurality of axially disposed second control rods 144 which are preferably axially aligned with the first control rods 124. The fourth one way clutches 140 are configured to lock when the second annulus 134 (and the third annular clutch plate 52) translates to the right in FIGS. 1 and 2 relative to the second control rods 144 and release when the second annulus 134 translates to the left relative to the second control rods 144. A plurality of second compression springs 146 are received about the second control rods 144 between the housings 138 of the fourth one way clutches 140 and a plurality of stops 148 such as a taper pins or C-washers and bias the second control rods 144 to the left relative to the fourth one way clutches 140. The spring constants (rates) of the first and the second compression springs 126 and 146 are the same.

The second, intermediate clutch drive plate 38 includes, as noted, the radially extending drive disc 44 which extends beyond the axis of the control rods 124 and 144. Disposed between the adjacent ends of the first control rods 124 and the drive disc 44 are a plurality of third compression springs 152 and between the adjacent ends of the second control rods 144 and the drive disc 44 are a plurality of fourth compression springs 154. The spring constants (rates) of the third and the fourth compression springs 152 and 154 are the same and are very much smaller than the spring constants of the first and the second compression springs 126 and 146. The third and the fourth compression springs 152 and 154 provide a biasing or restoring force to the respective first and the second control rods 124 and 144, driving them away from the drive disc 44.

The operation of the twin clutch assembly 20 will now be described with reference to FIGS. 1, 2, 3, 4 and 5. In FIG. 2, the dual clutch assembly 20 is in neutral, the first, the second and the third clutch drive discs 34, 38 and 52 are separated from the first and the second driven clutch plates 60 and 70. There is, therefore, no drive torque being transmitted from the input shaft 14 to either of the first or the second countershafts 82 or 84.

Figure 3:
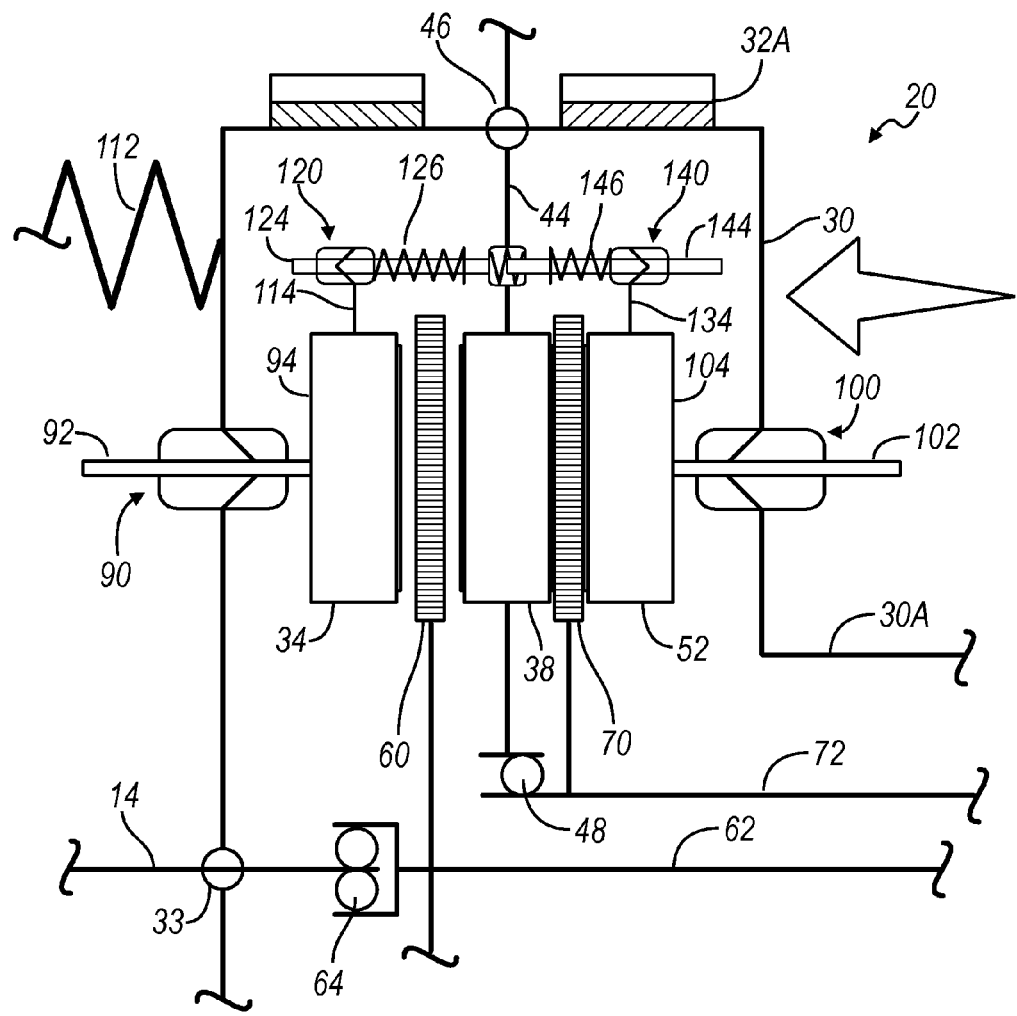
FIG. 3 is an enlarged diagrammatic view of a portion of a dual clutch assembly according to the present invention with one clutch engaged.

In FIG. 3, the actuator 110 has been energized to translate the inner clutch carrier 30 to the left. The plurality of second linear one way clutches 100 lock the rods or shafts 102 to the inner carrier 30 and the third clutch drive plate 52 translates to the left to engage the second driven clutch plate 70 between the second and the third clutch drive plates 38 and 52, thereby transferring drive torque from the input shaft 14 to the second drive tube, quill or output member 72, the second output gear 76, the second countershaft gear 78 and the second countershaft 84.

Figure 4:
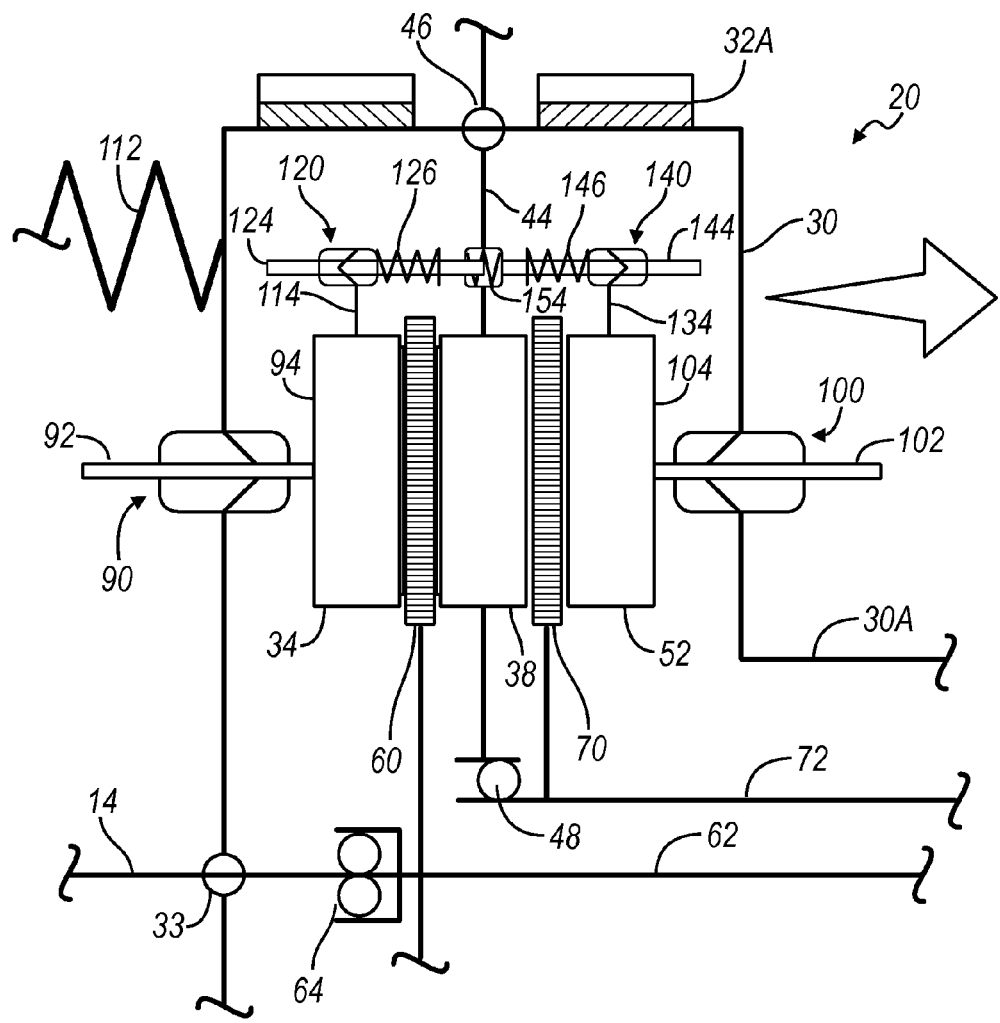
FIG. 4 is an enlarged diagrammatic view of a portion of a dual clutch assembly according to the present invention with another clutch engaged.

In FIG. 4, the actuator 110 has been energized to translate the inner clutch carrier 30 to the right, to disengage the second driven clutch plate 70 and engage the first driven clutch plate 60. Motion of the output of the actuator 110, assisted by the compression spring 112, translates the inner clutch carrier 30 to the right and releases engagement between the plurality of second one way clutches 100 and the second rods or shafts 102. Thus, the third clutch drive plate 52 translates to the right due to the force of the second compression spring 146 and the fourth compression spring 154, such that no drive torque is transmitted therethrough. At the same time, the plurality of first linear one way clutches 90 lock the inner carrier 30 to the first rods or shafts 92 and the first clutch drive plate 34 translates to the right to engage the first driven clutch plate 60 between the first clutch drive plate 34 and the second clutch drive plate 38, thereby transferring drive torque from the input shaft 14 to the first output shaft 62, the first output gear 66, the first countershaft gear 68 and the first countershaft 82.

Figure 5:
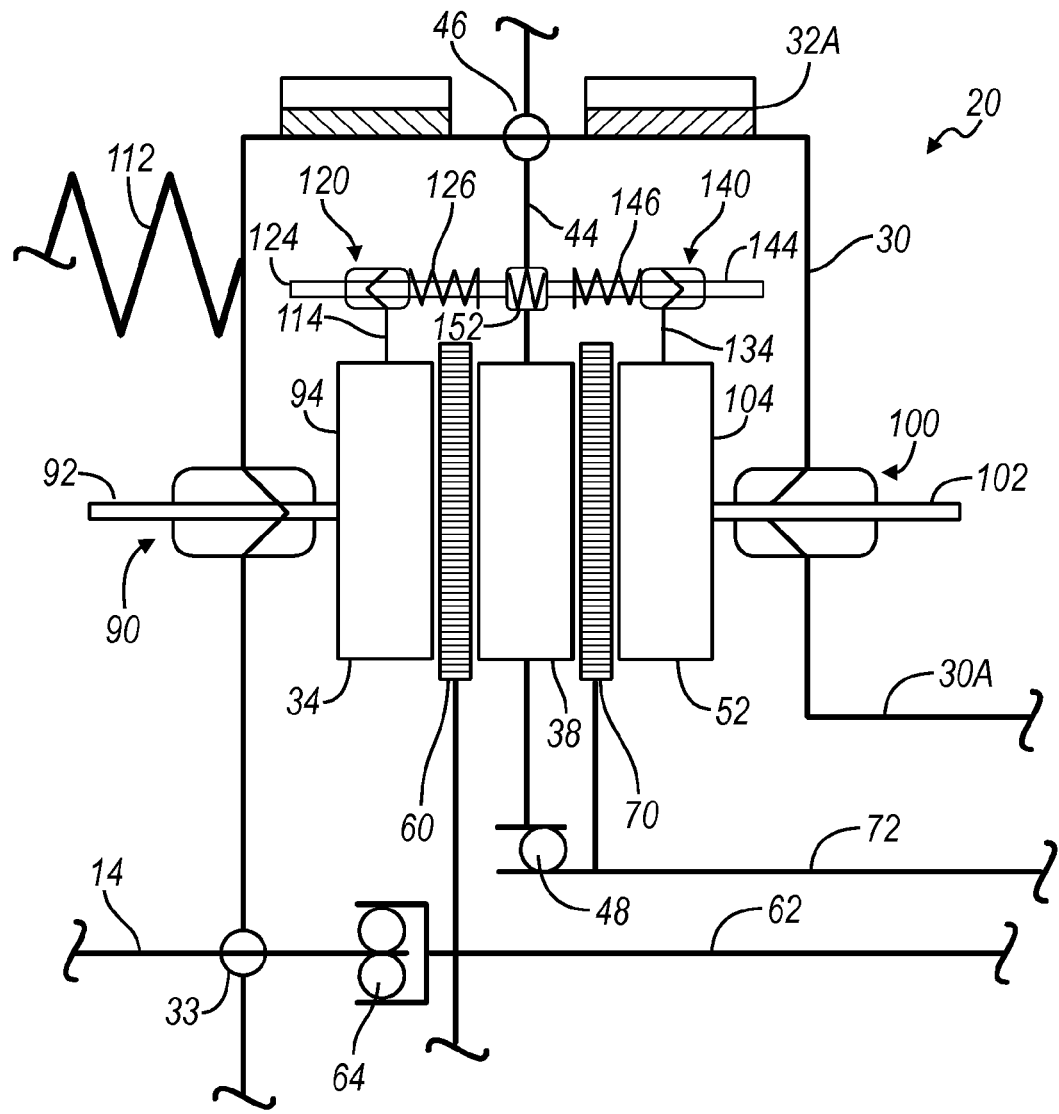
FIG. 5 is an enlarged diagrammatic view of a portion of a dual clutch assembly according to the present invention illustrating its self-adjusting action.

In FIG. 5, the dual clutch assembly 20 returns to neutral as the actuator 110 centers the inner carrier 30. The plurality of first linear one way clutches 90 thus release and the first and the third compression springs 126 and 152 translate the first clutch drive plate 34 to the left and disengage the first driven clutch plate 60 from the first and the second clutch drive plates 34 and 38. At the same time, the plurality of second linear one way clutches 100 has locked and moves the third clutch drive plate 52 to the left to prepare for re-engagement and to compensate for wear. In this regard, note the separation between the clutch plates 34, 60, 38, 70 and 52 in FIG. 2 which represents a start-up or initial activation state and the separation in FIG. 5 which represents an operational or self-adjusted state. In both figures, the separation has been exaggerated for purposes of explanation and understanding.

It should be understood that, as noted, since the pluralities of linear one way or overrunning clutches 90, 100, 120 and 140 and the associated pluralities of rods or shafts 92 and 102 and the control rods 124 and 144 are discrete components, they will preferably and typically be disposed in threes or fours about the center axis of the clutch assembly 20 at equally spaced circumferential intervals of 120° or 90°, respectively. It should also be understood that for reasons of clarity and explanation, certain of these components have been rotated into the viewing plane in the various drawing figures. The actuator 110 is, however, preferably an annular component that surrounds the shafts or quills of the clutch assembly 20 and includes (if hydraulic or pneumatic) an annular piston slidably disposed within an annular cylinder.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A dual clutch assembly comprising, in combination,
a first clutch drive disc having a first friction face,
a second, center clutch drive disc having a second friction face and a third friction face,
a third clutch drive disc having a fourth friction face,
a carrier member connected to and driving said first, second and third clutch drive discs,
a first driven clutch disc disposed between said first friction face and said second friction face,
a second driven clutch disc disposed between said third friction face and said fourth friction face,
a clutch actuator for axially translating said carrier member, a first one way clutch disposed between said carrier member and said first clutch drive disc and a second one way clutch disposed between said carrier member and said third clutch drive disc, a first control rod associated with said first clutch drive disc and a second control rod associated with said third clutch drive disc, a third one way clutch operably disposed between said first clutch drive disc and said first control rod and a fourth one way clutch operably disposed between said third clutch drive disc and said second control rod, a first compression spring disposed between said third one way clutch and said first control rod and a second compression spring disposed between said fourth one way clutch and said second control rod, and a third compression spring operably disposed between said second clutch drive disc and said first control rod and a fourth compression spring operably disposed between said second clutch drive disc and said second control rod.

2. The dual clutch assembly of claim 1 further including an input shaft coupled to said carrier member.

3. The dual clutch assembly of claim 1 wherein said first, second and third clutch drive discs include friction material.

4. The dual clutch assembly of claim 1 further including an outer housing coupled to and driven by an input shaft and an annular spline set disposed between said outer housing and said inner carrier.

5. The dual clutch assembly of claim 1 wherein said first and second compression springs have a spring constant higher than a spring constant of said third and fourth compression springs.

6. The dual clutch assembly of claim 1 wherein said operator is a hydraulic piston and cylinder assembly and further including an outer housing and a spring disposed between said outer housing and said carrier member.

7. The dual clutch assembly of claim 1 wherein said one way clutches are linear.

8. The dual clutch assembly of claim 1 further including a first countershaft driven by said first driven clutch disc and a second countershaft driven by said second driven clutch disc.

9. A twin clutch assembly for a dual clutch transmission comprising, in combination,
   a first, outer clutch plate having a first face,
   a second, center clutch plate having a second face and a third face,
   a third, outer clutch plate having a fourth face,
   a carrier member connected to and driving said first, second and third clutch plates,
   a first driven clutch plate disposed between said first outer clutch plate and said second, center clutch plate,
   a second driven clutch plate disposed between said second, center clutch plate and said third, outer clutch plate,
   an actuator for axially translating said carrier member,
   a first one way clutch disposed between said carrier member and said first, outer clutch plate and a second one way clutch disposed between said carrier member and said third, outer clutch plate,
   a first control rod associated with said first, outer clutch plate and a second control rod associated with said third, outer clutch plate,
   a third one way clutch operably disposed between said first, outer clutch plate and said first control rod and a fourth one way clutch operably disposed between said third, outer clutch plate and said second control rod, and
   a first compression spring disposed between said third one way clutch and said first control rod and a second compression spring disposed between said fourth one way clutch and said second control rod.

10. The twin clutch assembly of claim 9 further including an input member coupled to said outer and said center clutch plates.

11. The twin clutch assembly of claim 9 wherein said center clutch plate and said first and second outer clutch plates include friction material.

12. The twin clutch assembly of claim 9 further including an outer housing coupled to and driven by an input shaft and an annular spline set disposed between said outer housing and said carrier member.

13. The twin clutch assembly of claim 9 further including an outer housing coupled to and driven by an input shaft and a spring disposed between said outer housing and said carrier member.

14. The twin clutch assembly of claim 9 wherein said operator is a hydraulic piston and cylinder assembly.

15. The twin clutch assembly of claim 9 further including a first countershaft drivingly coupled to said first driven clutch plate and a second countershaft drivingly coupled to said second driven clutch plate.

16. The twin clutch assembly of claim 9 further including a third compression spring operably disposed between said second, center clutch plate and said first control rod and a fourth compression spring operably disposed between said second, center clutch plate and said second control rod.

17. The twin clutch assembly of claim 16 wherein said first and second compression springs have a spring constant higher than a spring constant of said third and fourth compression springs.

18. A dual clutch assembly for a dual clutch transmission comprising, in combination,
   a first, outer clutch plate having a first face,
   a second, center clutch plate having a second face and a third face,
   a third, outer clutch plate having a fourth face,
   a carrier member connected to and driving said first, second and third clutch plates,
   a first driven clutch plate disposed between said first outer clutch plate and said second, center clutch plate,
   a second driven clutch plate disposed between said second, center clutch plate and said third, outer clutch plate,
   an actuator for axially translating said carrier member,
   a first one way clutch disposed between said carrier member and said first, outer clutch plate and a second one way clutch disposed between said carrier member and said third, outer clutch plate.

19. The dual clutch assembly of claim 18 further including a first control rod associated with said first, outer clutch plate and a second control rod associated with said third, outer clutch plate,
   a third one way clutch operably disposed between said first, outer clutch plate and said first control rod and a fourth one way clutch operably disposed between said third, outer clutch plate and said second control rod, and
   a first compression spring disposed between said third one way clutch and said first control rod and a second compression spring disposed between said fourth one way clutch and said second control rod.

* * * * *